United States Patent [19]
Zimmerman et al.

[11] Patent Number: 5,649,035
[45] Date of Patent: Jul. 15, 1997

[54] FIBER OPTIC STRAIN GAUGE PATCH

[75] Inventors: Bernd Dieter Zimmerman, Inman, S.C.; Gershon Yaniv, Scottsdale, Ariz.; Ken-An Lou, Phoenix, Ariz.; Dirk Jeffery Hardtmann, Phoenix, Ariz.; Donald Clark Stevens, Phoenix, Ariz.

[73] Assignee: Simula Inc., Phoenix, Ariz.

[21] Appl. No.: 552,692

[22] Filed: Nov. 3, 1995

[51] Int. Cl.$^6$ .............. G02B 6/00; G01B 11/16; G01L 1/24
[52] U.S. Cl. .............. 385/13; 356/32; 356/345; 250/227.14; 73/800
[58] Field of Search .............. 385/12–13; 356/32, 356/345, 352, 35.5; 73/800; 250/227.14–227.19

[56] References Cited

U.S. PATENT DOCUMENTS

| | | | |
|---|---|---|---|
| 4,928,004 | 5/1990 | Zimmermann et al. | 250/227.14 |
| 4,947,693 | 8/1990 | Szuchy et al. | 73/800 |
| 5,094,527 | 3/1992 | Martin | 73/800 X |
| 5,189,299 | 2/1993 | Zimmermann et al. | 250/227.16 |
| 5,201,015 | 4/1993 | von Bieren et al. | 385/13 |
| 5,399,854 | 3/1995 | Dunphy et al. | 250/227.17 |
| 5,488,475 | 1/1996 | Friebele et al. | 385/12 X |

*Primary Examiner*—Rodney B. Bovernick
*Assistant Examiner*—Hemang Sanghavi
*Attorney, Agent, or Firm*—Crowell & Moring LLP

[57] ABSTRACT

A fiber optic sensor for measuring strain on and within structures. The sensor includes an optical fiber, two reflective markers, and two thin layers of carrier material. The optical fiber is looped multiple times within the two thin layers of the carrier material. The optical signal circulates multiple times through the sensing region, as it is travels through the multiple loops of optical fiber within the carrier layers. The fiber optic sensor can be embedded within a structure, as that structure is being fabricated, or it can be attached onto a preexisting structure. An optical signal generated from a source such as a laser is input into one end of the optical fiber. The signal is reflected at reflective markers at predetermined positions in the optical fiber. The time delay of the signals received back is then analyzed to calculate the strain in the structure.

49 Claims, 5 Drawing Sheets

FIBER OPTIC STRAIN GAUGE PATCH

BACKGROUND

1. Field of the Invention

The present invention relates to the measurement of strains on and within structures using fiber optic sensors.

2. Background of the Invention

Fiber optic sensors have been used for many years to measure parameters such as strain, temperature, stress, displacement, acceleration, and other physical and chemical properties of structural components. The inherent advantage of fiber optic sensors is their immunity to electromagnetic interference (EMI) and their resistance to corrosion. Additional advantages include their small size, large band-width, and low signal loss.

Optical fiber sensors can be categorized according to the approach used to modulate and demodulate the optical signal. Five common modulation and demodulation techniques are time delay modulation, amplitude modulation, phase modulation, polarization modulation and wavelength modulation. Each technique has its advantages and disadvantages for particular applications. Time-delay modulation is most advantageous for monitoring strain in large structures over periods of time as long as 10 to 40 years.

U.S. Pat. No. 4,928,004 to Zimmermann, et al. ("Zimmerman I"), which is incorporated herein by reference, discloses monitoring strain in a structure using an optical fiber, with discrete reflective markers along its length, embedded in the structure or attached to the structure. The time delay between adjacent reflections from the reflective markers is a measure of the absolute fiber length of any given segment. Thus strain in the structure can be monitored by monitoring changes in time delays.

This approach is very limited due to the resolution with which time delay can be currently measured. The time delay between measurements can be measured using an Optical Time Domain Reflectometer ("OTDR"). However, the most advanced OTDR cannot measure time delay with a resolution much better than ±1 picosecond (ps). This corresponds to a strain measurement resolution of approximately ±130 130 microstrain (µε). Many applications require a strain measurement resolution of ±10 µε, i.e., at least one order of magnitude better than ±130µε.

U.S. Pat. No. 5,189,299 to Zimmermann, et al. ("Zimmerman II"), discloses increasing the interaction length of the optical fiber by using fiber optic "re-entrant loops." These loops direct the optical signal through the same length of optical fiber many times, thereby causing the optical signal to experience the effects of the parameters being measured (e.g., strain) many times as well. Zimmerman II uses special "tap-off" couplers to split off and re-circulate portions of the optical signal. The end result is improved measurement resolution because the optical signal propagates through the sensing region many times, not just twice (as in Zimmerman I). The most important drawback of the re-entrant loop technique is that multiple sensors cannot be connected in-line to monitor different sections of a structure. Furthermore, the tap-off couplers have excessive loss characteristics, severely attenuating the optical signal.

U.S. Pat. No. 5,201,015 to Von Bieren, et al. ("Von Bieren"), discloses the use of pre-tensioned fiber optic "coils" to form an interferometric sensor. Von Bieren's sensor, however, requires the use of relatively expensive special elliptical core fibers, and requires imposing a bias strain on the fiber coil. Furthermore, Von Bieren does not allow serial connection of multiple coils.

SUMMARY OF THE INVENTION

Figure 1:
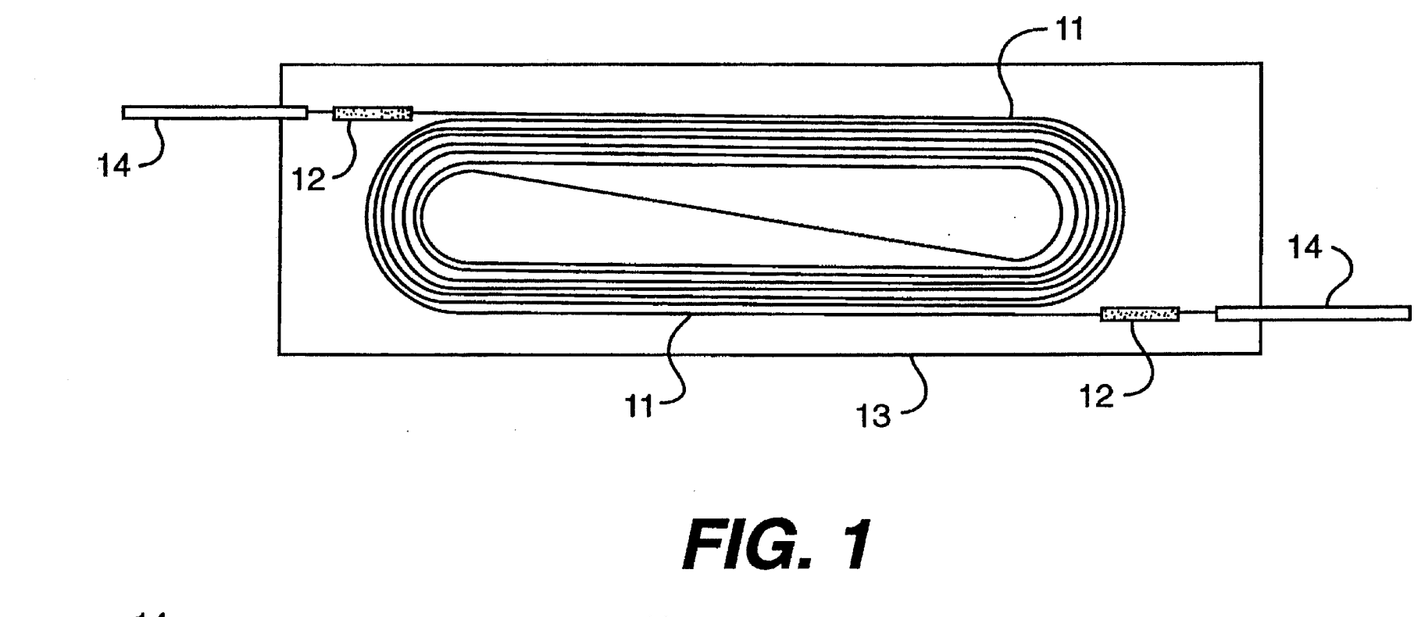
FIG. 1 is a schematic diagram of a top view of the FOSGP with the embedded optical fiber and reflective markers, showing access from both ends.
Figure 2:
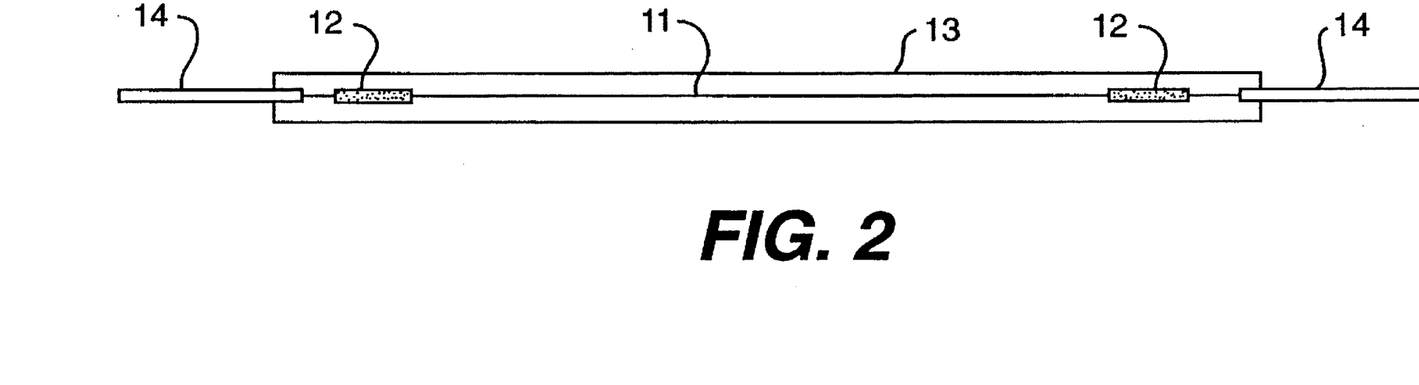
FIG. 2 is a schematic diagram of a side view of the FOSGP with the embedded optical fiber and reflective markers, showing access from both ends.

The present invention is a fiber optic strain gauge patch ("FOSGP") which can be embedded in or attached to various structures to monitor strain in those structures. As shown in FIGS. 1 and 2, the FOSGP is an optical fiber looped many times within two thin layers of protective carrier material. The FOSGP includes an optical fiber with two reflective markers at a predetermined distance along the length of the optical fiber, and two thin layers of the carrier material. The optical fiber, with its reflective markers, is looped multiple times between the two carrier layers, thus multiplying the effects being monitored, and thus providing increased sensitivity and accuracy.

The elongation of the structure between the two reflective markers is monitored by measuring the elongation of the optical fiber. The elongation of the optical fiber is determined by monitoring the changes in the time of flight of the optical signal between the reflective markers. The strain in the structure is calculated using an empirical relationship which takes into account the curvature of the loops at the two ends of the FOSGP.

The carrier layers can either be cured in situ within the structure (for example, for use with composite materials), or can be pre-cured and then embedded into or attached to the structure (for example, for use with steel or concrete).

The FOSGP is fabricated by manufacturing an optical fiber with reflective markers at predetermined positions in the fiber. The optical fiber with the reflective markers is then placed on a layer of carrier material in a predetermined number of loops. After the predetermined number of optical fiber loops have been placed on the first carrier layer, a second carrier layer is placed over the optical fiber loops. The resulting patch, with either one or both access fibers emerging from the patch, can then be cured for applications where patch rigidity is important (e.g., concrete, steel), or left uncured, in applications where patch rigidity is not as critical (e.g., composite materials). When it is used with composite materials, the FOSGP can be cured as the composite structure is cured.

The carrier material keeps the optical fibers in position, and prevents fiber cross-over. Most importantly, the carrier material allows easy installation of the sensor in the field, by eliminating the need to wind the fibers in potentially adverse environments. The carrier material also protects the fibers during installation.

The present invention increases the sensitivity of the optical fiber sensor by circulating the optical signal many times through the sensing region by physically looping the optical fiber multiple times within a flexible patch embedded within or attached to the structure. The present invention uses standard "off-the-shelf" multi-mode or single-mode optical fiber. There is no signal attenuation due to "tap-off." Furthermore, it allows in-line interrogation of multiple sections within the structure, by serially connecting individual FOSGPs separated by reflective markers. The time delay between reflective markers is measured to determine the strain in each FOSGP.

The FOSGP is immune to Electro-Magnetic Interference (EMI), resistant to corrosion, capable of both serial and parallel multiplexing, is accessible from a single lead fiber end, and is inherently redundant because it can provide for access to the opposite fiber end (in case of damage to the original end). The FOSGP can be used to monitor structures such as bridges and towers, to probe the structural integrity of aircraft components, and to measure strain in structures in strong electromagnetic fields such as power plants broadcasting towers.

Accordingly, it is the object of the present invention to measure strain on and within structures.

It is another object of the present invention to continually monitor structures and components for strain.

It is also an object of the present invention to measure strain in environments that contain strong electro-magnetic fields.

It is a further object of the present invention to allow co-fabrication of the fiber optic sensor during processing of the structure to be monitored.

These and other objects of the present invention are described in greater detail in the detailed description, the appended drawings, and the attached claims.

DETAILED DESCRIPTION OF THE INVENTION

A first preferred embodiment of the present invention is shown in FIGS. 1 and 2. An optical fiber 11, preferably a standard single-mode or multi-mode fiber of the type used in telecommunication systems, is segmented with two reflective markers 12 along its length. Multiple loops of the optical fiber are placed onto a first layer of flexible carrier material 13, as shown in FIG. 1. Both ends of the optical fiber are routed outside of the carrier material. The ends of the optical fiber are encased in flexible protective cover 14 (e.g., tubing), to protect the optical fibers during embedding or attachment, and to reduce any optical signal degradation outside of the sensing region.

A second layer of carrier material is then placed over the optical fiber loops, as shown in cross-section in FIG. 2. The second layer of carrier material is preferably identical to the first layer in size and material. The two layers of carrier material are then pressed against each other using relatively light pressure (for example, ranging from about 0 to about 20 psi, preferably from about 10 to about 13 psi), to avoid fiber damage. The cross-section of the preferred embodiment of the two carrier layers and the optical fiber is shown in FIG. 2. Flexible cover 14 is placed over the lead-in fibers to protect them against damage during subsequent embedding or attachment of the FOSGP into or onto the structure to be monitored. The flexible cover also avoids any optical coupling of the lead fibers to the structure, thereby minimizing the chances of optical signal degradation or attenuation outside of the sensing region. The protective flexible cover may be fabricated from, e.g., polyimide-coated glass, or high-modulus plastic such as Teflon, PVC, polyimide or polyurethane.

Figure 3:
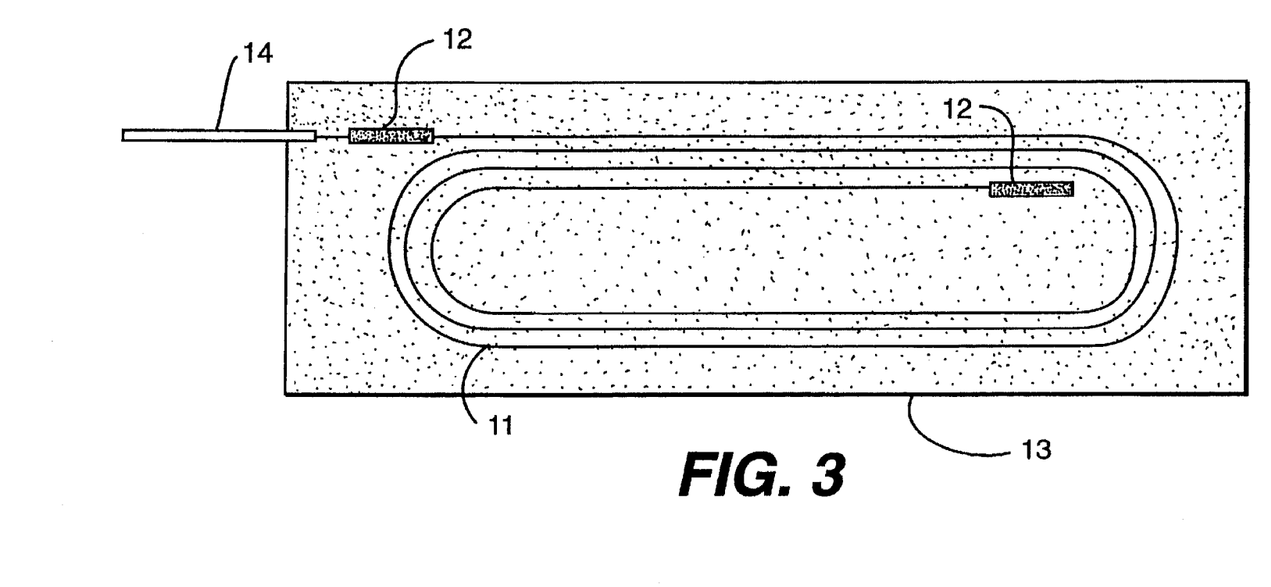
FIG. 3 is a schematic diagram of a top view of the FOSGP with the embedded optical fiber and reflective markers, showing access from only one end.
Figure 4:
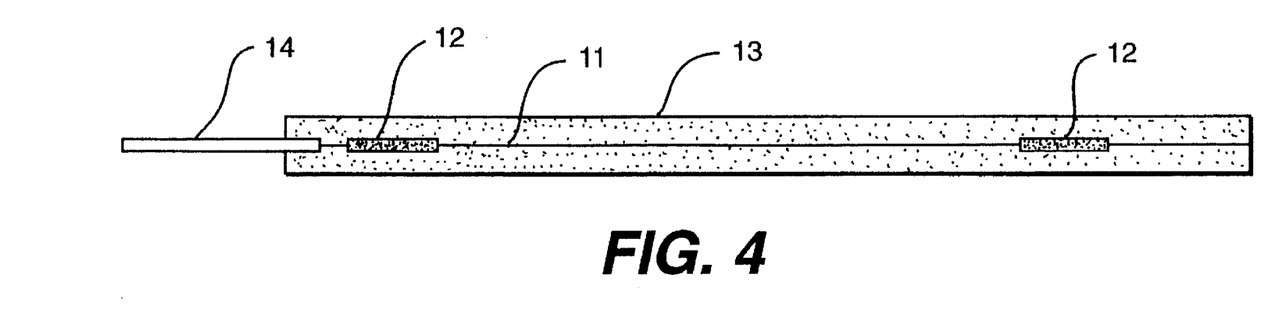
FIG. 4 is a schematic diagram of a side view of the FOSGP with the embedded optical fiber and reflective markers, showing access from only one end.

FIGS. 3 and 4 show a second preferred embodiment of the present invention. The second preferred embodiment uses only one lead-in optical fiber. The opposite end of the optical fiber is simply terminated at the second reflective marker. The second embodiment is faster to install than the first embodiment, because only one lead-in optical fiber must be routed out of the structure. However, the second embodiment does not provide the redundancy of the first preferred embodiment, i.e., if the first lead-in wire fails, there is no second lead-in wire with which to retrieve sensor data.

The reflective markers are fabricated by changing the reflective properties of a section of the optical fiber so that the optical signal is partly reflected and partly transmitted. For example, reflective markers can be fabricated by cleaving the optical fiber, and realigning the fiber with a small air-gap between the cleaved ends of the fiber. This produces a reflection at each marker of approximately 8 percent of the forward propagating optical signal. This reflection travels back towards the monitoring system for evaluation. Lead-in fiber lengths are chosen to allow access to the sensor from either end, once the FOSGP is embedded in or attached to the structure. The distance between the adjacent reflective markers may typically vary, depending on the required resolution, from less than 10 cm to greater than 10 m. Ideally, the size of the reflectors (i.e., theft diameter and length) is as small as possible to minimize the overall thickness of the FOSGP. Preferably, the diameters of the reflectors are 1.0 mm or less and the lengths of the reflectors are 1.5 cm or less.

The looping of the optical fiber onto the first layer of carrier material may be done manually or by using an automated fiber winding mechanism. The fibers do not need to lie immediately against each other, but the closer they lie against each other, the more compact the FOSGP will be. The radii of the curved sections should preferably be greater than 1.0 cm—smaller radii result in greater losses of optical signal through the cladding of the fiber.

The carrier material is preferably compatible with the material of the structure into or onto which the FOSGP is to be embedded or attached. For example, if the FOSGP is to be embedded in a composite material, the carrier layer may preferably use the same resin as that of the composite. In that case, during fabrication of the composite structure, the carrier material will cure concurrently with the composite structure. Examples of carrier layer materials include flexible thermoset materials such as epoxy, polyester and vinylester, as well as thermoplastics such as polyphenylene sulfide (PPS), polycarbonate, and nylon.

Preferably, the adhesion of the optical fiber to the carrier material is sufficient, at room temperature, to allow looping the optical fiber onto the carrier, without requiring additional adhesives or tapes to hold the fiber in position. Alternatively, a layer of adhesive may be deposited onto the carrier material before looping the optical fiber thereon. When used with thermoset carrier materials, the optical fibers can adhere to the carrier at elevated temperatures, and can therefore be looped onto the carrier layers at elevated temperatures without an adhesive.

If the FOSGP carrier material can be cured during the processing of the structure, the FOSGP with its protected lead-in fibers are preferably temporarily wound onto a drum for storage, or stored flat between protective sheets of release film. Teflon film may be used to prevent the uncured carrier layers from sticking to the drum. When it is ready for processing, the uncured FOSGP is unwound from the drum, or removed from between the protective sheets, and placed in the structure. In composite structures, this requires laying up several sheets of "pre-preg" or wet lay up composite materials, placing the FOSGP on these layers, and then completing the process with the remaining "pre-preg" or wet lay up composite material layers. The uncured component with embedded FOSGP is then placed in the appropriate environment for curing and for structure consolidation.

Other applications require installation of the FOSGP in the field. One such application is the retrofitting of columns of bridges with composite wrapped jackets. In this application, the composite material is wrapped around the bridge column to approximately half its final thickness, then the FOSGP is positioned on these first layers, and the jacket installation is completed by winding the remaining layers over the FOSGP. The jacket and the FOSGP are then cured using, e.g., surface-mounted heat blankets. The lead-in optical fibers of the FOSGP are routed out of the composite jacket at a position which is least susceptible to accidental damage. A fiber optic connector or splice enclosure may be installed at the base of the structure for sensor monitoring.

Some materials, such as steel, may not allow the embedding of the FOSGP during processing. Also, the FOSGP cannot be readily embedded into already-manufactured structures. In these applications, it is necessary to pre-cure the FOSGP's carrier layers and attach the FOSGP to the structure to be monitored, using suitable adhesives, such as epoxies, urethanes, cyanoacrylates or acrylics.

Figure 5:
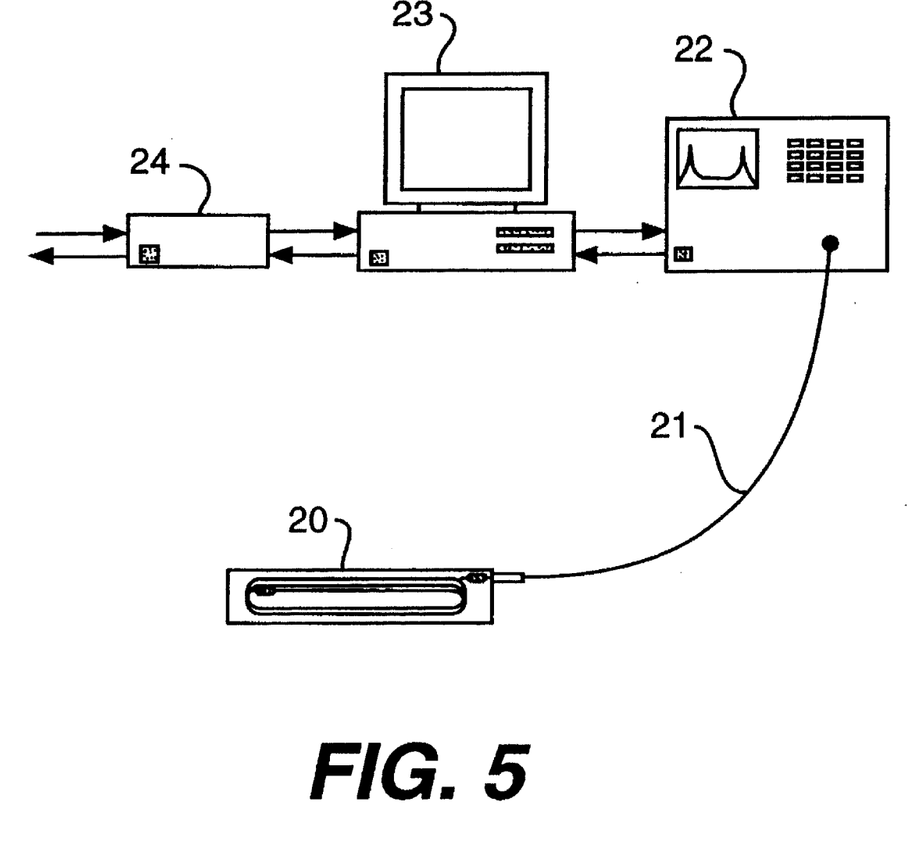
FIG. 5 is a schematic diagram showing the system components required to remotely monitor structural strain with the FOSGP.

In the preferred embodiments of the present invention, the embedded or surface-attached FOSGPs are connected to a monitor, such as a high-resolution Optical Time Domain Reflectometer (OTDR), which is capable of measuring the time delay between reflections with, e.g., ±1 to ±5 picosecond resolution (as required for the specific application). As shown in FIG. 5, connecting optical fiber 21 connects FOSGP 20 to OTDR monitoring system 22, which may be interfaced with Personal Computer 23, which can be used to control the measurement parameters and to receive and store data.

Figure 6:
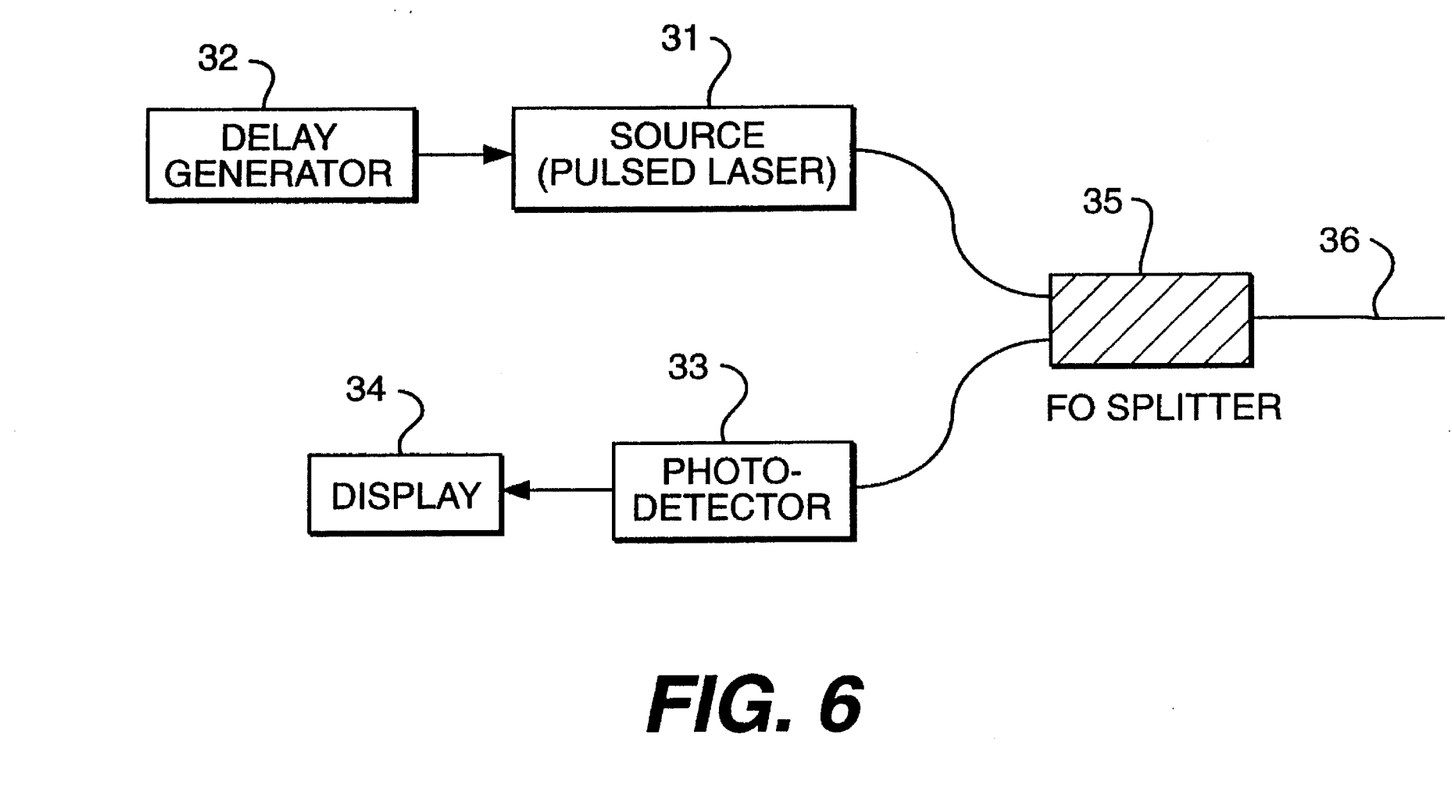
FIG. 6 is a schematic diagram of an OTDR monitoring system.

As shown in FIG. 6, a typical OTDR monitoring system may include a source 31, a delay generator 32, a fast rise-time photo-detector 33, a display 34, and a fiber optic splitter 35 connected to the input fiber 36 carrying the optical signal to and from the sensors. The OTDR system may operate at almost any wavelength for which an optical signal source and a detector are available, and at which a low-loss optical fiber is available. A preferred OTDR system would, e.g., have a wavelength range of 700 to 1,600 nm. For example, lasers having wavelengths of 850 nm, 1310 nm or 1550 nm are commonly used by the telecommunications industry, and are therefore readily available and relatively inexpensive. The present invention was demonstrated using an 850 nm laser, a silicon photodetector, and a 100/140μm, core/cladding diameter multi-mode optical fiber.

Optical fiber 21 and any additional optical fibers within the OTDR are preferably of the same type as the optical fiber in the FOSGP. As shown in FIG. 5, the OTDR monitoring system may be accessed remotely through telephone modem 24 connected to personal computer 23.

Figure 7:
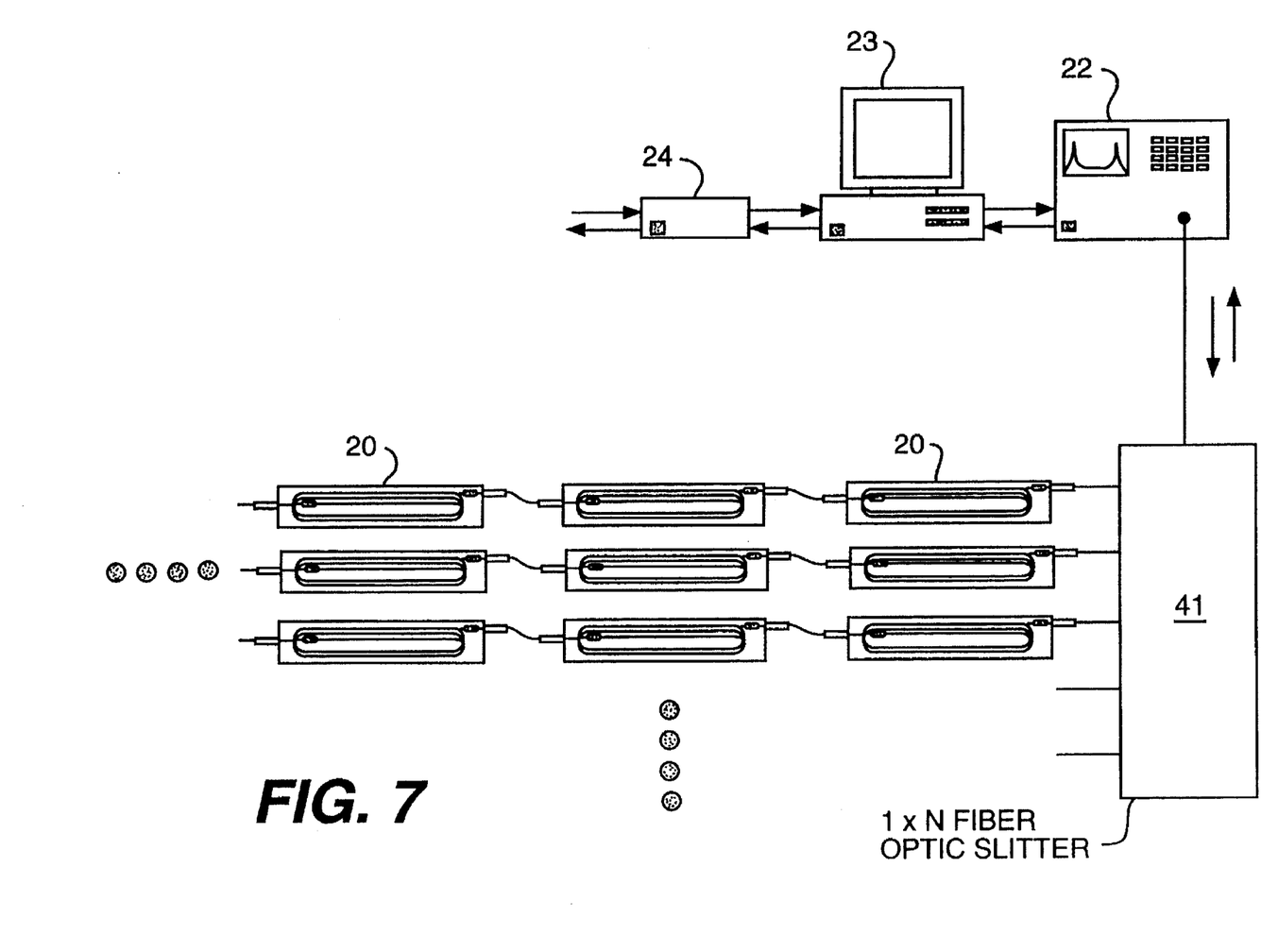
FIG. 7 is a schematic diagram of the serial and parallel multiplexing of a number of FOSGPs, monitored by a single high-resolution OTDR.

FIG. 7 shows how an OTDR system may be connected, using 1×N fiber optic splitter 41, i.e., a fiber optic coupler having one single input end and N-multiple output ends, and an array of FOSGPs 20 connected serially and in parallel, to monitor different regions of one or several structures. For example, such a system could be used in a bridge to monitor the performance of different structural members of the bridge. (A fiber optic splitter can function either as a beam splitter or as a coupler, and will be referred to herein as a splitter.) Different regions on one structural member could be monitored using several FOSGPs connected in series, with the FOSGPs on different structural members being connected in parallel.

Because the FOSGP is mechanically coupled to the structure to be monitored, strain in the structure produces strain in the optical fiber. The region over which the strain is measured is defined by the position of the two reflectors in each FOSGP. Each FOSGP has a number (N) of straight sections of optical fiber of length (L) along the loading axis. The structural strain (ξ) can be calculated from a measurement of the time delay change (Δt) in the time the optical signal travels between reflectors according to:

$$\epsilon = (AK\Delta t)/(NL)$$

where K is the strain sensitivity factor of the optical fiber (typically measured in units of μ/ps), and A is a geometric factor which takes into consideration the curved sections of fiber (which also contribute to the change in time delay under strain).

The value of the strain sensitivity coefficient K depends on the specific optical fiber in the FOSGP. K must be determined for each particular type of fiber by calibration. Standard multimode and single-mode optical fibers typically have strain sensitivity coefficients typically in the range of from 100 to 150 μm/ps. Geometric factor (A), which takes into consideration the curved fiber sections within the FOSGP, is generally determined by calibration. It typically has a value of about 0.75. Once K and A have been determined for a particular optical fiber type and a particular geometry, they do not have to be re-determined for each individual FOSGP having that particular optical fiber type and geometry.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A fiber optic strain gauge patch comprising:
 (a) a first layer of protective carrier material;
 (b) an optical fiber having a first end and a second end, formed in a plurality of loops, and disposed onto the first layer of protective carrier material;
 (c) a first reflective marker in the optical fiber in proximity to the first end of the optical fiber;
 (d) a second reflective marker in the optical fiber in proximity to the second end of the optical fiber; and
 (e) a second layer of protective carrier material disposed onto the optical fiber,
    wherein the first and second layers of protective carrier material hold the optical fiber in position with respect to the first and second layers of protective carrier material.

2. The fiber optic strain gauge patch of claim 1, wherein the second layer of protective carrier material is substantially identical in size and material to the first layer of protective carrier material.

3. The fiber optic strain gauge patch of claim 1, further comprising flexible protective cover placed over at least one of the first and the second ends of the optical fiber.

4. The fiber optic strain gauge patch of claim 1, wherein the first end of the optical fiber is routed outside of the fiber optic strain gauge patch.

5. The fiber optic strain gauge patch of claim 4, wherein the first and the second ends of the optical fiber are routed outside of the fiber optic strain gauge patch.

6. The fiber optic strain gauge patch of claim 1, wherein the first layer of protective carrier material is selected such that it holds the optical fiber in position without the use of any adhesive.

7. The fiber optic strain gauge patch of claim 1, wherein the first layer of protective carrier material is a thermoset material.

8. The fiber optic strain gauge patch of claim 1, wherein the optical fiber terminates at the second reflective marker.

9. The fiber optic strain gauge patch of claim 1, wherein the protective carrier material is a composite material.

10. The fiber optic strain gauge patch of claim 1, wherein the optical fiber is kept in its position using an adhesive.

11. A system for measuring strain comprising:
   (a) a fiber optic strain gauge patch comprising a first layer and a second layer of protective carrier material, an optical fiber having a first end and a second end, formed in a plurality of loops, and disposed onto the first layer of protective carrier material, first and second reflective markers on the optical fiber in proximity to the first and second ends, respectively, of the optical fiber, wherein the first and second layers of protective carrier material hold the optical fiber in position with respect to the first and second layers of protective carrier material;
   (b) a monitor connected to the optical fiber in the fiber optic strain gauge patch by a connecting optical fiber, said monitor comprising a light source, a delay generator, a fast rise-time photodetector and a fiber optic splitter;
   (c) means for analyzing data derived from optical signals reflected by the reflective markers to calculate strain in the optical fiber.

12. The system of claim 11, further comprising a personal computer in communication with the optical time domain reflectometer.

13. The system of claim 12, further comprising a modem in communication with the personal computer.

14. The system of claim 11, wherein the second layer of protective carrier material is substantially identical in size and material to the first layer of protective carrier material.

15. The system of claim 11, further comprising flexible protective cover placed over at least one of the first and the second ends of the optical fiber.

16. The system of claim 11, wherein the first layer of carrier material is selected such that it holds the optical fiber in position without the use of any adhesive.

17. The system of claim 11, wherein the first layer of carrier material is a thermoset material.

18. The system of claim 11, wherein the light source is a laser having a wavelength in the range of 700 to 1600 nanometers.

19. The system of claim 11, wherein the carrier material is a composite material.

20. The system of claim 11, further comprising a 1×N fiber optic splitter having a single input end and N-multiple output ends optically connected at its single end to the optical time domain reflectometer, wherein the fiber optic strain gauge patch is one of a plurality of fiber optic strain gauge patches optically connected to the N-multiple end of the 1×N fiber optic splitter.

21. A method for making a fiber optic strain gauge patch comprising:
   (a) preparing a first and a second layer of protective carrier material;
   (b) preparing an optical fiber having a first end and a second end, and having a first reflective marker in proximity to the first end and a second reflective marker in proximity to the second end;
   (c) placing the optical fiber in multiple loops on the first layer of protective carrier material;
   (d) encasing the first end of the optical fiber in protective flexible cover;
   (e) placing the second layer of protective carrier material over the optical fiber; and
   (f) pressing the first and second layers of protective carrier material against each other at a pressure ranging from about 0 psi to about 20 psi.

22. The method of claim 21, wherein the pressure ranges from about 10 to about 13 psi.

23. The method of claim 21, wherein the first and second layers of protective materials are composite materials comprising a first resin.

24. The method of claim 21, wherein the protective carrier materials are uncured during steps (a)–(f), further comprising
   (g) curing the protective carrier materials.

25. The method of claim 21, wherein the protective carrier materials are uncured during steps (a)–(f), further comprising:
   (g) embedding the fiber optic strain gauge patch in a structure;
   (h) routing at least one end of the optical fiber outside of the structure; and
   (i) curing the embedded fiber optic strain gauge patch.

26. The method of claim 25, wherein the structure is a composite material comprising a second resin.

27. The method of claim 26, wherein the composite material of the structure and the protective carrier layers are cured simultaneously.

28. The method of claim 26, wherein the first resin and the second resin are the same resin.

29. The method of claim 21, wherein the carrier material is selected from one of epoxy, polyester, vinylester, polyphenylene sulfide, polycarbonate and nylon carrier materials.

30. The method of claim 21, wherein the protective flexible cover is selected from one of polyimide-coated glass and high-modulus plastic tubing.

31. A method for measuring strain in a structure comprising:
   (a) providing a fiber optic strain gauge patch having a first layer of protective carrier material, multiple loops of an optical fiber with a first end, a second end, a first reflective marker in proximity to the first end, a second reflective marker in proximity to the second end, and a second layer of protective carrier material, said first and second layers of protective materials covering and enclosing said multiple loops of the optical fiber;
   (b) optically connecting the first end of the optical fiber to a time domain reflectometer having a light source, a delay generator, a fast rise-time photo-detector and a fiber optic splitter;

(c) using the optical time domain reflectometer to input a first light pulse into the first end of the optical fiber;

(d) using the optical time delay reflectometer to detect light pulses reflected by the first and second reflective markers;

(e) measuring the time delay between light pulses reflected by the first reflective marker and light pulses reflected by the second reflective marker; and (f) calculating the strain in the structure from the time delay between light pulses.

32. The method of claim 31, wherein the optical fiber is characterized by its strain sensitivity, and wherein the multiple loops of the optical fiber are characterized by the number of straight sections of optical fiber in the optical fiber strain gauge patch, the length of each such straight section, and a geometric factor, and wherein the strain in the structure is calculated from the number of straight sections of optical fiber in the fiber optic strain gauge patch, the length of each such straight section, the strain sensitivity of the optical fiber, and the geometric factor.

33. The method of claim 31, wherein a plurality of fiber optic strain gauge patches monitoring the same plurality of regions are optically connected to the optical time domain reflectometer, and wherein the strain in the structure in each region is calculated from the time delay of pulses reflected from reflective markers in the fiber optic strain gauge patch mounted on that region.

34. The method of claim 31, wherein the wavelength of the light source ranges from about 700 nanometers to about 1600 nanometers.

35. The method of claim 31, wherein the carrier material is a composite material.

36. The method of claim 31, wherein the optical fiber is kept in its position using an adhesive.

37. The method of claim 31, wherein the carrier material is selected from one of epoxy, polyester, vinylester, polyphenylene sulfide, polycarbonate and nylon carrier materials.

38. The method of claim 31, wherein the carrier material is a thermoset material.

39. The method of claim 31, wherein the step of calculating the strain in the structure comprises obtaining the geometrical factor of the multiple loops of optical fiber by calibration.

40. The method of claim 31, wherein the optical fiber is a multi-mode fiber.

41. The method of claim 31, wherein the optical fiber is a single mode fiber.

42. A fiber optic strain gauge patch for installation in a composite material comprising:

(a) an optical fiber having a first end and a second end, disposed in loops onto a first layer of protective carrier material;

(b) a first reflective marker in the optical fiber in proximity to the first end of the optical fiber;

(c) a second reflective marker in the optical fiber in proximity to the second end of the optical fiber; and (d) a second layer of protective carrier material disposed onto the optical fiber, wherein the first and second layers of protective carrier material hold the optical fiber in position with respect to the first and second layers of protective carrier material, and wherein the protective carrier material is selected such that the curing characteristics of the carrier material match the curing characteristics of the composite material sufficiently such that the carrier material can be cured as the composite material is cured.

43. The fiber optic strain gauge patch of claim 42, further comprising flexible protective cover placed over at least one of the first and the second ends of the optical fiber.

44. The fiber optic strain gauge patch of claim 42, wherein the first end of the optical fiber is routed outside of the fiber optic strain gauge patch, and the second end of the optical fiber is terminated within the fiber optic strain gauge patch.

45. The fiber optic strain gauge patch of claim 42, wherein the first layer of protective carrier material is selected such that it holds the optical fiber in position without the use of any adhesive.

46. The fiber optic strain gauge patch of claim 42, wherein the first layer of protective carrier material is a thermoset material.

47. The fiber optic strain gauge patch of claim 42, wherein the response of the optical fiber is characterized by a geometric factor.

48. The fiber optic strain gauge patch of claim 42, wherein the optical fiber is a multi-mode optical fiber.

49. The fiber optic strain gauge patch of claim 42, wherein the optical fiber is a single mode optical fiber.

* * * * *